T. B. ATTERBURY.
MANUFACTURE OF HOLLOW GLASS WARE.

No. 181,618. Patented Aug. 29, 1876.

Witnesses
Paul Bakewell
R. C. W. Fenshaw

Inventor
Thomas B. Atterbury
by Bakewell & Kerr
his Attorneys

UNITED STATES PATENT OFFICE.

THOMAS B. ATTERBURY, OF PITTSBURG, PENNSYLVANIA, ASSIGNOR TO HIMSELF AND JAMES S. ATTERBURY, OF SAME PLACE.

IMPROVEMENT IN MANUFACTURE OF HOLLOW GLASSWARE.

Specification forming part of Letters Patent No. 181,618, dated August 29, 1876; application filed August 5, 1876.

*To all whom it may concern:*

Be it known that I, THOMAS B. ATTERBURY, of Pittsburg, in the county of Allegheny and State of Pennsylvania, have invented a new and useful Improvement in the Manufacture of Hollow Glassware; and I do hereby declare the following to be a full, clear, and exact description thereof, reference being had to the accompanying drawing, forming part of this specification, in which—

Figure 1:
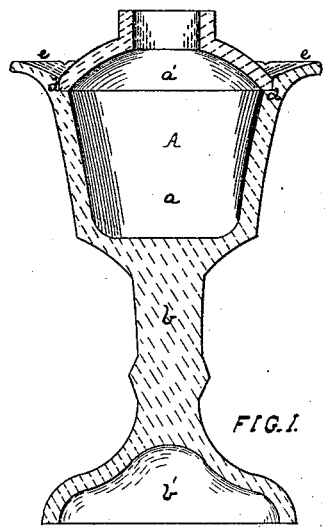
Figure 2:
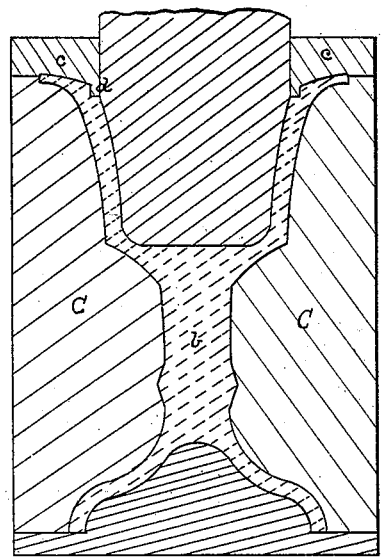
Figure 3:
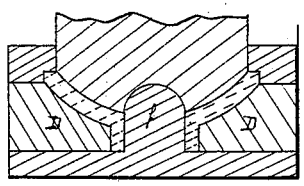
Figure 4:
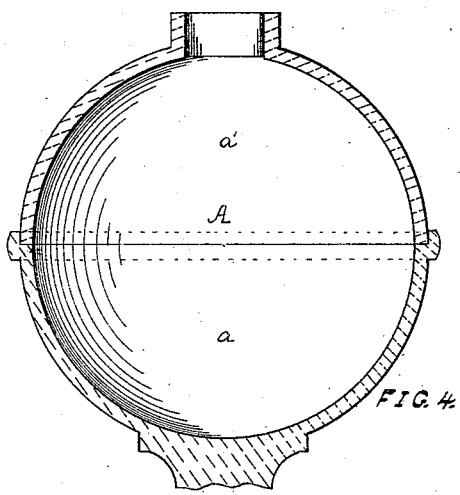
Figure 5:
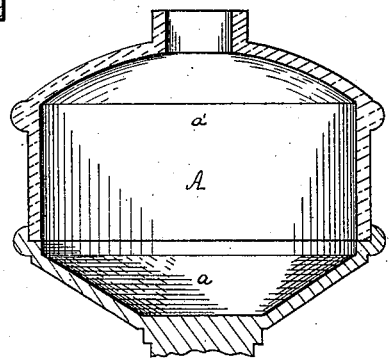

Figure 1 is a sectional view of a lamp illustrating my invention. Figs. 2 and 3 are sectional views of molds intended to illustrate the manner of carrying out my invention. Figs. 4 and 5 illustrate modifications in pressing.

Like letters refer to like parts wherever they occur.

My invention relates to the manufacture of that class of hollow glassware wherein the lip or opening of the article is contracted, or is narrower than other portions of the article, such as lamps, decanters, some forms of vases, pitchers, &c.; and it consists in pressing up the article in sections, so that the receiving-sections shall have "marees" or offsets, and bringing the sections together, the plain within the mareed, while at a welding-heat, thereby causing them to unite, whereby a pressed-glass hollow article of the class specified is obtained without reheating or further manipulation.

Heretofore in the manufacture of this class of articles two methods have been commonly followed: first, blowing the article in a mold; and, secondly, pressing the article in such a shape as will allow of the withdrawal of the plunger, and subsequently reheating and closing in the lip by hand. The first method is expensive, and produces a light and fragile article, while the second method limits the form which can be given to the article, and greatly enhances the cost of manufacture because of the extent of manipulation subsequent to pressing, and which requires skilled labor. It also consists in such a hollow article of glassware having a pressed flange or collar-piece for the reception of a collar, such, for instance, as the collar of a lamp or of a jug-top. This flange, as made in the blowing operation hereinbefore mentioned, is very defective, as the glass blows very thin in small cavities, is irregular in thickness, and has a ragged "blow-over," which must be filed off after the glass is annealed. The filing operation, on account of the nature of the glass and the varying thickness of the blown flange, causes a large loss by breakage, as portions of the flange are frequently split off under the file, thereby spoiling the lamp. Even when properly filed the flange is, as a rule, defective, and does not afford a good seat for the collar, and the inequalities can only be cured by a liberal use of cement to build it out and fill the collar. When formed by hand in the finishing of lamps, which have theretofore been pressed, as above described, the flange is equally defective. As it is formed by hand, the eye of the workman being his only guide, it is never regular and uniform, but of irregular height and thickness, and with a thickened rim or bead at the edge caused by the gathering of the glass with the finishing-tool. The flange I make by pressing is perfect in form, and fills the cavity in which it is made, the glass flowing into such cavity by the direct pressure of the plunger. It affords a perfect seat for the collar or ring, which fits to it as accurately as it does to the die upon which it is formed, obviates all the difficulty of attaching the collar heretofore encountered, gives a perfect joint, and requires only just sufficient cement, when cement is used, to cause adhesion of the parts. This flange may be formed in the operations in which the upper or collar part of a hollow article is pressed separately, and in which the article is completed by the attachment of the other parts, closing the other end.

I will now proceed to describe my invention, so that others skilled in the art to which it appertains may apply the same.

Having determined the shape to be given to the hollow article to be formed, I divide it up into such shaped sections as can be readily pressed in a mold, and in order to insure the adjustment of the sections I form offsets or marees upon those which receive and guide the other portions. In forming an article the several sections are preferably pressed at or about the same time, and while at a welding-heat the sections thus pressed are brought together, so as to unite. If necessary, a tool is passed rapidly over the joints with light pressure to insure union; but even so slight a manipulation is rarely necessary.

In the drawing, A indicates a lamp formed in accordance with my invention, composed of two sections, $a\ a'$. The section $a$ may be provided with the foot and stem $b\ b'$, and in that case will be pressed in a sectional mold, C, having a ring, $c$, which is so shaped as to leave a maree or offset, $d$, in the lower section $a$, and, if desired, a drip-flange, $e$, may likewise be formed on said section. The upper section $a'$ is pressed in a mold, D, having a central peg, $f$, for forming the collar-orifice. The two sections $a\ a'$ are pressed in the usual manner and at or about the same time. The section $a'$ is then removed from its mold while still at a welding-heat and adjusted in position on section $a$, when the two sections will unite, forming a tight joint. To insure the joint, however, the workman may pass a tool lightly over the points of contact between the two sections.

In Figs. 4 and 5 I have simply shown the different points where joints may be readily made in a lamp of the form chosen for illustration.

In some cases, notably where an outward curve or flange, as at $e$, is formed, the edges of the sections may be beveled, thus obtaining the effect of an offset without departing from the spirit of my invention, which depends upon forming a hollow article with matched sections.

It is evident that hollow articles of various shapes can be readily produced by this method, and even hermetically-sealed hollow glass articles may be formed, if desired.

The flange $h$ may be formed by means of a plunger, which goes through the glass into the bottom of the mold; but this does not make as perfect a flange as the mold shown. In some lamps a second or filling orifice is used. The flange for such orifice may be pressed by a suitable mold and plunger by my improved method of making hollow glassware.

The advantages arising from my invention are, that a pressed-glass lamp, decanter, or like article, can be manufactured cheaper and more rapidly than could heretofore be done, and by unskilled labor.

Having thus described my invention, what I claim, and desire to secure by Letters Patent, is—

1. As an improvement in the manufacture of hollow pressed glassware, forming the article in sections, of which the receiving ones have marees or offsets, and then adjusting the sections while at a welding-heat, or such a heat as will cause the sections to unite, substantially as and for the purpose specified.

2. A hollow article of glassware, composed of pressed sections united by means of marees or offsets formed on the receiving-sections, substantially as and for the purpose specified.

3. A hollow article of glassware with contracted neck or opening, having one or more pressed collar-flanges, substantially as described.

In testimony whereof I, the said THOMAS B. ATTERBURY, have hereunto set my hand.

THOMAS B. ATTERBURY.

Witnesses:
F. W. RITTER, Jr.,
JAMES I. KAY.